(12) United States Patent  
Chakraborty

(10) Patent No.: US 9,743,354 B2
(45) Date of Patent: Aug. 22, 2017

(54) LOW POWER HARMONIC WAKE UP RADIO

(71) Applicant: Texas Instruments Incorporated, Dallas, TX (US)

(72) Inventor: Sudipto Chakraborty, Plano, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 233 days.

(21) Appl. No.: 14/588,629

(22) Filed: Jan. 2, 2015

(65) Prior Publication Data
US 2016/0198409 A1    Jul. 7, 2016

(51) Int. Cl.
*H04W 52/02* (2009.01)
(52) U.S. Cl.
CPC ......... *H04W 52/0229* (2013.01); *Y02B 60/50* (2013.01)
(58) Field of Classification Search
CPC ........... H04W 56/002; H04W 56/0085; H04W 88/085
USPC ........................................................ 370/350
See application file for complete search history.

(56) References Cited

U.S. PATENT DOCUMENTS

| | | | |
|---|---|---|---|
| 7,248,850 B2* | 7/2007 | Shen | H03D 7/1433 455/318 |
| 8,325,704 B1* | 12/2012 | Lemkin | H04J 3/0667 370/347 |
| 8,461,901 B1* | 6/2013 | Morton | H03D 7/1441 327/355 |
| 2007/0104165 A1* | 5/2007 | Hanaoka | H04B 7/022 370/338 |
| 2007/0205872 A1* | 9/2007 | Kim | H04W 52/0229 340/10.33 |
| 2011/0310640 A1* | 12/2011 | Tao | H02M 3/3376 363/34 |
| 2012/0063447 A1* | 3/2012 | Tyrrell | H04W 56/00 370/350 |

* cited by examiner

*Primary Examiner* — Mohammad Anwar
*Assistant Examiner* — Kokou R Detse
(74) *Attorney, Agent, or Firm* — John R. Pessetto; Charles A. Brill; Frank D. Cimino

(57) ABSTRACT

A wireless receiver includes a receiver mixer having at least two sets of switches connected to selectively pass a portion of a received RF signal to the mixer's output. Different sets of the switches are activated by different phases of a local oscillator to effect passing of different phases of the RF signal to the output. These outputs are combined in various ways to obtain operation of the main receiver and the wake up receiver modes at harmonically related carrier frequencies with as low as possible subharmonic multi-phase clock generation network. This can be used to detect a wake up signal with a very fast response time, minimal area overhead, minimal power usage, and equal loading to the local oscillator network providing the phases to the mixer to maintain excellent phase balance and precise harmonic selectivity.

20 Claims, 3 Drawing Sheets

LOW POWER HARMONIC WAKE UP RADIO

TECHNICAL FIELD

This invention relates generally to radios and more particularly to circuits for waking up a radio from a low power mode.

BACKGROUND

Communication devices of various kinds rely on various circuitries to control different aspects of electronic communication between devices. With the rise of wireless communication devices such as mobile phones, smart phones, tablet computers, and other mobile devices that communicate wirelessly, power and battery efficiency become a significant concern. One way to conserve power in a wireless radio is to power down the circuitry of the radio (typically in what is called a low power mode) when the radio is not being used. A problem with this approach is that the radio needs to be a least periodically powered up to detect whether another device is trying to send a communication to the radio. However, this takes a long time to wake up, thereby reducing battery longevity.

One approach to solving this problem is to include a separate lower power radio for detecting the incoming signal. This approach, however, requires more hardware built into the communication device. Another approach is to configure the radio of the communication device to listen for the incoming communication, which approach costs more current and battery life. Moreover, with the increasing abilities of modern communication devices, there is pressure to have the radio wake up process occur in a very fast wake up time with low latency while also conserving battery life.

SUMMARY

Generally speaking, and pursuant to these various embodiments, a wireless receiver includes a receiver mixer having at least two sets of switches connected to selectively pass a portion of a received RF signal to the mixer's output. Different sets of the switches are activated at different phases of a local oscillator to effect passing of different phases of the RF signal to the output. For example, a ring oscillator can drive a passive mixer. It is well known that ring oscillator architecture consumes much lower area and provides much faster start-up compared to L/C voltage controlled oscillators (VCOs). Ring oscillators can be implemented using odd number of delay-cells to provide multiple outputs that are $$\frac{2\pi}{N}$$

apart, where N is the number of stages. To reduce the current consumption of the wake up radio, ring oscillators can be operated at F/N where F is the center frequency of the desired RF frequency. As the ring oscillator's current consumption increases with frequency, a low frequency ring oscillator architecture is fundamentally suitable for realizing low current local oscillator signal gain. Hence, all the phases of the ring oscillator are interfaced to passive mixers, and by weighing the phasors with respect to voltage or current, a fundamental tone at n*F can be obtained.

So configured, such a wireless receiver exhibits a very fast wake up time (on the order of 100 nanoseconds to 10 microseconds) with a minimal amount of overhead in terms of hardware. Moreover, the architecture operates using lower power as compared to other approaches. Also, because there is easy harmonic combination with equal weighting of load to the oscillator, there are reduced problems associated with component mismatch. These and other benefits may become clearer upon making a thorough review and study of the following detailed description.

BRIEF DESCRIPTION OF THE DRAWINGS

The above needs are at least partially met through provision of the low power wake up radio using harmonic combination described in the following detailed description, particularly when studied in conjunction with the drawings wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
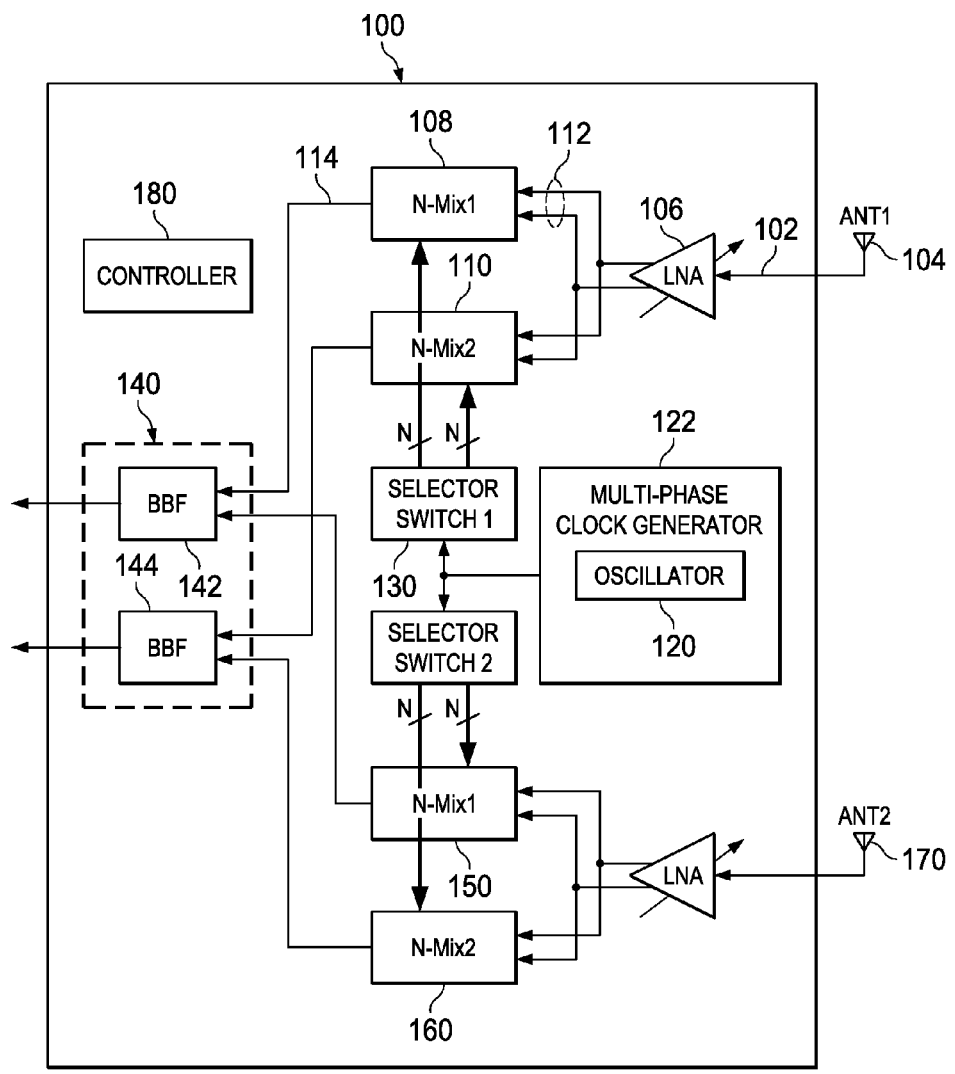
FIG. 1 comprises a block diagram of an wireless receiver as configured in accordance with various embodiments of the invention.

Referring now to the drawings and, in particular, FIG. 1, an example apparatus 100 for converting a radio frequency (RF) signal with multiple local oscillator phases will be described. The apparatus 100 includes an input 102 configured to receive an RF signal. In the illustrated example, the input 102 is connected to receive signals from an antenna 104 that receives a wireless signal. Typically, the input 102 runs to an amplifier such as a low noise amplifier 106 to amplify the received signal. The amplifier's 106 output is provided to one or more receiver mixer's 108, 110. Each receiver mixer 108, 110 includes at least one input 112 configured to receive an RF signal and an output 114. The mixer 108 is configured to receive different phases of a local oscillator 120 to effect passing of different phases of the RF signal to the output 114. In one approach, the local oscillator 120 is part of a multi-phase clock generator or local oscillator network 122 configured to generate a variety of phases of a base clock frequency. Examples include an L/C oscillator followed by an odd integer divider or by passive phase shifters and amplifiers or a ring oscillator having an odd number of stages. Such multi-phase clock generators are known in the art. A phase controller 130 is operatively connected to the local oscillator network 122 and configured to provide phases to the receiver mixer 108 to effect the desired phasors of the local oscillator 120 to receive by the receiver mixer 108. The phase controller 130 or a separate controller that drives the phase controller 130 selects the phases to provide to the receiver mixer 108 to minimize interference and false detection during wake up. The phase controller 130 may include selector switches as are known in the art. Optionally, and as illustrated in FIG. 1, the phase controller 130 can provide phases to more than one receiver mixer 108, 110.

In one approach, a baseband processing unit 140 is configured to receive an output from the receiver mixer 108 and to wake up the apparatus 100 from a low power mode in response to receiving a harmonic of a main receiver frequency for the apparatus 100. The baseband processing unit 140 may be split to separately process outputs from different receiver mixers 108, 110. In one example, the baseband processing unit 140 may include two (or more) separate baseband filter (BBF) circuits 142 and 144, each configured to detect and process signals at two relative orthogonal phases. For example, the first baseband filter block 142 may process a summed up signal from phases $\phi, 0, (360°-\phi)$, while the second baseband filter block 144 may process a summed up signal from phases $(90°-\phi)$, $90°$, $(90°+\phi)$. Thus, the final outputs from the baseband filter units 142 and 144 are orthogonal in nature. This is an illustration where phasor combination occurs at the input of the baseband processing units. Alternately, phasor combination may occur at the output of the baseband processing units. In this situation, blocks 142 and 144 may each be split using harmonic weightage and their outputs may be summed together to obtain the final outputs that are orthogonal in nature.

There can be two modes of operation for baseband filter section. All the hardware components are configurable in the main receiver as well as the wake up receiver modes. A wake up radio receiver may include an RF amplifier 106 and two mixers 108 and 110 configured to process signals in quadrature by applying desired phases from the local oscillator phasor network. In this configuration, baseband processing units 142 and 144 process quadrature phase information. In response to detecting a valid wake up signal, the main receiver mode consisting of blocks 150, 160 can be activated while 108 and 110 can be shut down. Once the main receiver burst is finished, the wake up mode may again be activated by activating 108 and 110. This description would be reversed when the frequency constellation of the main receiver and the wake up receiver is interchanged. In another configuration, the receivers may operate only on one phase of the signals instead of the quadrature phase. In this situation, the first baseband filter circuit 142 can be configured to detect a wake up signal with a specific bandwidth, and in response to detecting that wake up signal, initiate a wake up of the apparatus including the second baseband filter circuit 144 that may be configured to process signals a different primary communication bandwidth for the apparatus 100. With respect to the frequencies, in one approach, the wake up radio receiver operates at a first carrier frequency F1, and the main radio receiver operates at a second carrier frequency F2 where F1=N*F2, where N is an integer and where the local oscillator's frequency is one or an integral submultiple of F1 or F2, whichever is lowest. In this way, a subset of the processing unit 140 is used for fast detection of a wake up signal. Those skilled in the art will recognize and appreciate that such a processing unit or controller can comprise a fixed-purpose hard-wired platform or can comprise a partially or wholly programmable platform. All of these architectural options are well known and understood in the art and require no further description here.

Figure 2:
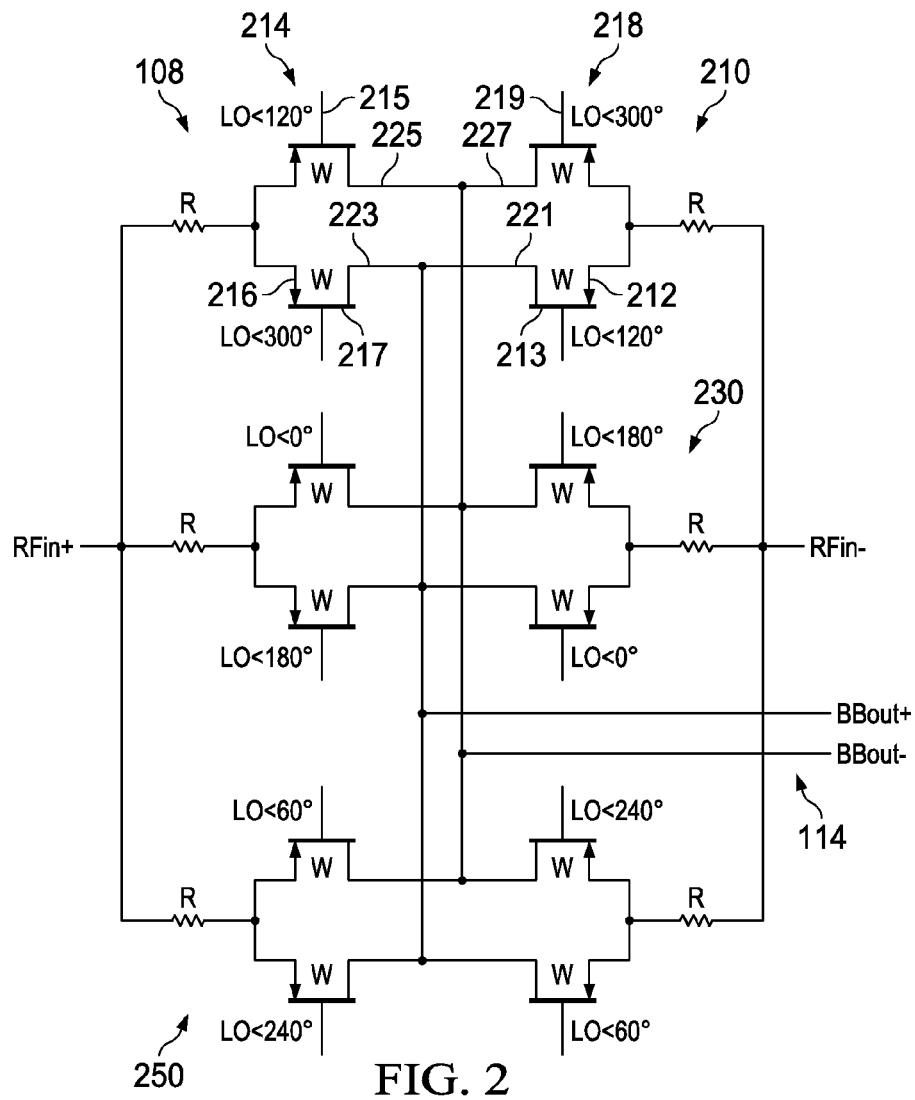
FIG. 2 comprises a circuit diagram of an example mixer as configured in accordance with various embodiments of the invention.

Turning to FIG. 2, one example of a receiver mixer 108 will be described. In this example, the mixer is a three stage mixer, and in general a $$\frac{2\pi}{P}$$

stage mixer where P denotes the harmonic order to be nulled (each stage including separate sets of switches) designed to provide equally weighted phases separated at 120° to perform fundamental nulling and third harmonic emphasis. Three sets 210, 230, 250 of switches are connected to selectively pass a portion of the RF signal to the output 114. Two, four, or more sets can be used to obtain different nulling and harmonic selective characteristics. The harmonic order is dependent on the phasor granularity and the weightage factor associated with the mixers. The input is a differential input with terminals RFin+ and RFin−, and the output 114 is a differential output with terminals BBout+ and BBout−. Individual ones of the sets 210, 230, 250 of switches are connected to be activated at different phases of the local oscillator 120 to effect passing of different phases of the RF signal to the output 114. For instance, the phase controller 130 can be configured to control opening and closing individual switches of the sets 210, 230, 250 of switches to effect desired phasors of the local oscillator 120 to receive by the receiver mixer 108 by connecting the phasor signal waveforms to gates of the individual switches.

Individual ones of the sets 210, 230, 250 of switches include two switches 212, 214 configured to provide a first phase from a local oscillator network 122 associated with the local oscillator to the receiver mixer 108 to receive the RF signal with a first phase shift. Another two switches 216, 218 are configured to provide a second phase from the local oscillator network 122 to the receiver mixer 108 to receive the RF signal with a second phase shift. As suggested above, the two switches 212, 214 providing the first phase from the local oscillator 120 are connected to receive the first phase from the local oscillator 120 at respective gates 213, 215 of the two switches 212, 214. Similarly, the another two switches 216, 218 providing the second phase from the local oscillator 120 are connected to receive the second phase from the local oscillator 120 at respective gates 217, 219 of the another two switches 216, 218. A drain 221 from a first switch 212 is electrically connected to a first node BBout+ of the output 114 and to a drain 223 from a first switch 216 of the another two switches configured to provide the second phase. A second node BBout− of the output 114, different from the first node BBout+, is electrically connected to a drain 225 from a second switch 214 of the two switches configured to provide the first phase and to a drain 227 from a second switch 218 of the another two switches configured to provide the second phase. The sources of the switches 212 and 218 are electrically connected to receive the RF signal via one RFin− of the differential input, and the sources of the switches 214 and 216 are electrically connected to receive the RF signal via the other differential input RFin+. This connection may include a resistive element R for loading purposes, which is typical in the art. The switches of the other sets 230 and 250 are similarly connected to receive the RF input, receive phases different from the other sets, and pass respective aspects of the received RF signal to the output 114 nodes BBout+ and BBout−. This approach provides equal loading to the local oscillator network 122 such that there is very little degradation due to mismatch whereas in traditional harmonic reject/combination architectures the performance may be limited by mismatches in the weight factor. In other words, the switches that provide local oscillator phasors to the main receiver mixer and the switches that provide local oscillator phasors to the wake up receiver mixer provide equal loading to the local oscillator network.

Figure 3:
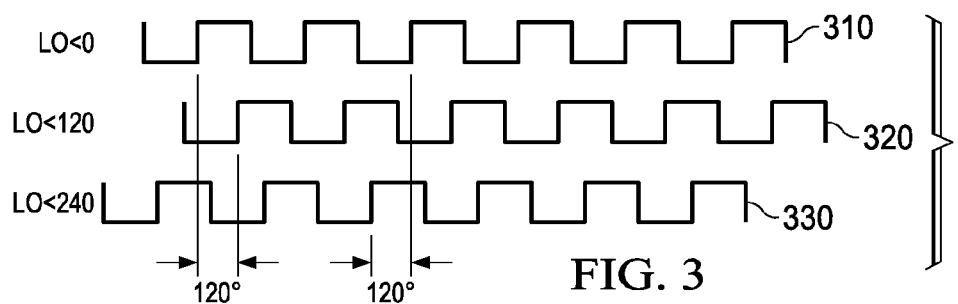
FIG. 3 comprises a graph of phasor waveforms applied to the mixer of FIG. 2 in one example of operation in accordance with various embodiments of the invention.

In the illustrated example, the first phase is 120°, and the second phase is 300°. In the next set 230 of switches, one pair of switches receives a 0° phase, and a second pair of switches receives a 180° phase. In the third set 250 of switches, one pair of switches receives a 60° phase, and a second pair of switches receives a 240° phase. By one approach illustrated in FIG. 3, the receiver mixer 108 is configured to receive multi-phase square waveforms 310, 320, 330 from the local oscillator 120 to receive a signal at a first RF frequency and to create a selective harmonic null at a second RF frequency. By opening and closing the switches according to these waveforms, certain harmonics of the received RF signal is nulled (i.e., muted so as to not be received by the controller receiving the mixer's output) and other harmonics are emphasized to facilitate detection of a signal at that harmonic. This can be especially useful in detecting a wake up signal, where the mixer is configured to emphasize a harmonic of the expected wake up RF signal and null other aspects of the received RF.

Because this approach uses the main signal path, very little area of the chip is used as compared to other radio wake up approaches. If a ring oscillator is used to provide the phases, the ring oscillator inherently utilizes multiple stages, so no additional power is consumed in creating the phases driving the mixer. Also, ring oscillators start up much faster compared to L/C oscillators, and the switch-over to the main radio after wake up signal is detected happens very fast. Moreover, the ring oscillator structure can intrinsically operate at a lower harmonic of the wake up signal frequency with multiple phases (for example, at 800 MHz for a wake up signal at 2.4 GHz) to use significantly less power. Also, when used for wake up purposes, the higher jitter of a ring oscillator does not create performance problems (switching to the LC oscillator for the main radio allow for the higher quality when using the radio for substantive communications).

Turning again to FIG. 1, additional mixers 110, 150, and 160 having structures similar to the receiver mixer 108 (but usually having different numbers of sets of switches and receiving different phases) can be included with the receiving apparatus. The different mixers 108, 110, 150, 160 can be configured to null and emphasize different frequency aspects. In one approach, the processing unit 140 is configured to operate in a time multiplexed fashion among the two or more receiver mixers 108, 110, 150, 160 to allow for receiving the various bandwidth signals emphasized by the individual mixers. More specifically, two mixers 108 and 114 can be connected to one antenna 104 and one phase controller 130 where one mixer 108 is configured to listen for a wake up signal and the other mixer 110 is configured to emphasize a main communication frequency. The wake up controller 180 configures the receiver hardware by programming various phases and phase enabling switches to the mixer 108 such that it operates in the wake up mode with for example, the wake up receiver working at carrier frequency F1 and the main receiver working at carrier frequency F2, where F1=n*F2 with N being an integer (in this specific case, an odd integer). Three situations can happen: (a) N>1, (b) N=1, (c) N<1. Once the wake up signal is detected, the phase controller 130 programs switch matrix positions to the other mixer 110 with N phases so that the harmonic constellation to receive the main receiver frequency band is emphasized. The front-end antenna and front-end amplifiers are tuned to the frequencies F1 and F2 for maximizing signal reception in both the wake up and the main receiver modes. In response to detecting the wake up signal, a control signal obtained from the baseband processor unit 140 wakes up the other mixer 110 and other portions of the processing unit 140 needed for executing the primary communication function of the receiver. As illustrated in FIG. 1, optionally a second antenna 170 can be connected to the other mixers 150 and 160 and configured for optimal communication at frequencies different from that for which the first antenna 104 is optimized to receiver. The mixers 150 and 160 could be configured to provide similar wake up/main radio functions for the second antenna 170 as that performed by the mixers 108 and 110 for the first antenna 104. The processing unit 140 could multiplex between mixers 108 and 150 during a low power mode and between mixers 110 and 160 during a full communication mode. Other combinations of multiplexing among the mixers are possible.

Figure 4:
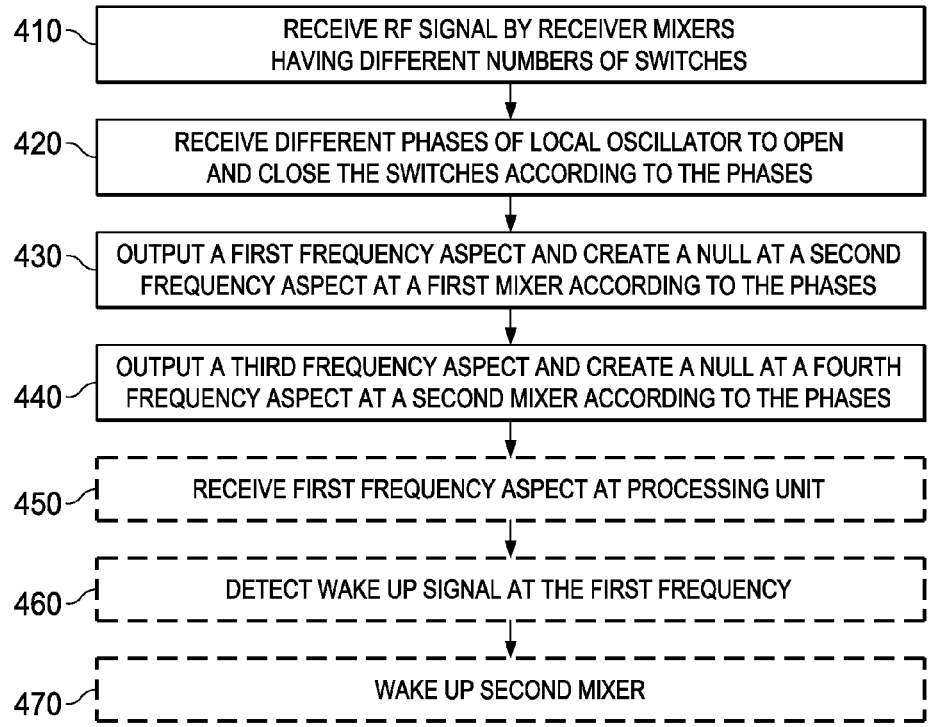
FIG. 4 comprises a flow diagram of an example method of operation for an apparatus configured in accordance with various embodiments of the invention.

An example method of converting among multiple phases in an RF signal setting will described with reference to FIG. 4. The method includes receiving 410 an RF signal by at least two receiver mixers respectively having at least two and different numbers of sets of switches. The different numbers of sets of switches allows the receiver to selectively receive different frequency harmonics as provided by the different mixers. Different phases of a local oscillator are received 420 at different gates of the sets of switches to effect opening and closing of the switches. In response to the receiving the different phases, a first one of the at least two receiver mixers outputs 430 a first frequency aspect of the RF signal and creates a selective harmonic null at a second RF frequency. Individual switches of the at least two sets of switches open and close based on the received phases to effect the output the first frequency aspect and the second frequency aspect. The phases are selected to minimize interference and false detection during wake up. The phases from the local oscillator are optionally provided from a same multi-phase clock generator to two or more of the at least two receiver mixers to save space and resources.

In response to the receiving the different phases, a second one different from the first one of the at least two receiver mixers outputs 440 a second frequency aspect of the RF signal different from the first frequency aspect and creates a selective harmonic null at a fourth RF frequency different from the third RF frequency. A processing unit receives 450 one or both of the first frequency aspect and the second frequency aspect. In a wake up radio approach, the processing unit detects 460 receipt of a wake up signal at one of the first frequency aspect and the second frequency aspect. In response to detecting the wake up signal, the method includes waking 470 up a radio receiver including the at least two receiver mixers and configuring the radio receiver to receive a primary radio signal that uses one of the first frequency aspect and the second frequency aspect. Optionally, the method may further include operating the processing unit in a time multiplexed fashion between individual ones of the at least two receiver mixers to allow receipt and processing of different signals.

So configured, a radio receiver can include an on-chip wake up radio that uses minimal power, operates at low latency, and has a small on-chip footprint.

Figure 5:
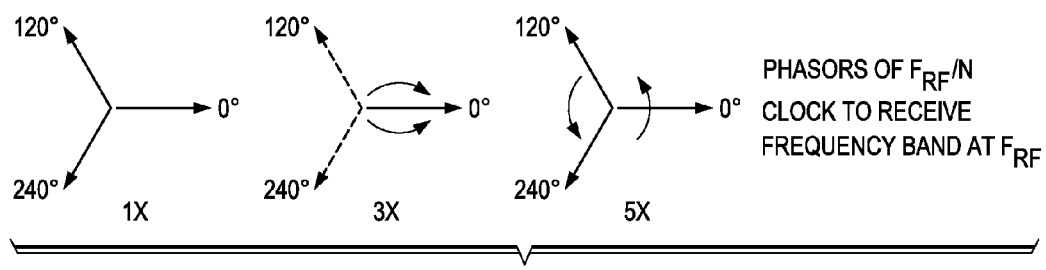
FIG. 5 comprises an illustration of an example of phasor control for the reception of a radio frequency signal.
Figure 6:
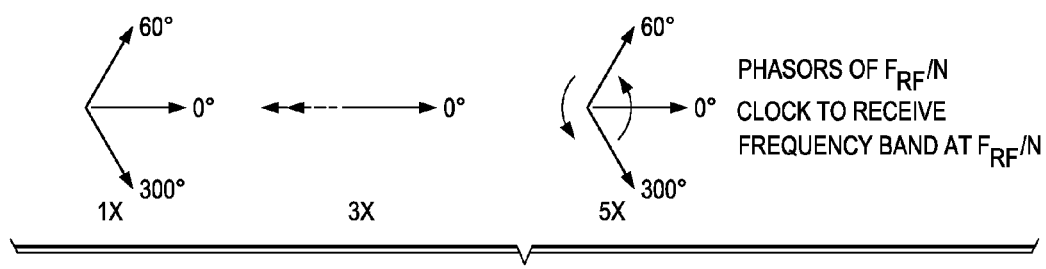
FIG. 6 comprises an illustration of another example of phasor control for the reception of a radio frequency signal.

FIGS. 5-6 illustrate an example of phasor control for the reception of the main receiver signal as well as the wake up receiver. For a K phase system where K=6, phase granularity of 60° is obtained. It is observed that when the three phases 0°, 120° and 240° are used, then there would be a null at the fundamental frequency, but signal would be received at the $3^{rd}$ harmonic. Similarly, when the three phases of 0°, 60°, and 300° are used, there would be signal reception at the fundamental frequency, but there would be a harmonic null at the $3^{rd}$ harmonic. All the phases are generated at a low frequency (F). Hence, during the operation of the receiver in the main receiver mode at the fundamental frequency (F), the phase controller provides controls to enable 0°, 60°, and 300° phases for the receiver mixers and enable 0°, 120°, and 240° phases during the wake up receiver mode. This way, main receiver signal is received at the fundamental carrier frequency F, and the wake up is signal is received at the $3^{rd}$ harmonic of the fundamental frequency 3F. These control signals can be swapped from the controller to receive the wake up signal at the fundamental frequency, F, and the main receiver signal at 3F. It would also be noted that these phasor signals are applied differentially to the mixers. Hence, for the 0°, 120°, and 240° phases, the complimentary phases are 180°, 300°, and 60° and are also applied to the differential sets of mixer switches. Similarly, for 0°, 60°, and 300° phases, the complimentary phases are 180°, 240°, and 120° also applied to the differential sets of mixer switches. Hence, in both ways, all phases from the local oscillator generation network are provided to the mixer switches, leading to equal loading per phase. This also reduces any imbalance for the harmonic combination operation. For 60° phase granularity, the harmonic weightage factor is equal among phases, leading to easy floorplanning and interface. When quadrature mixers are used, quadrature phases are enabled by the phase controller, while still providing symmetrical loading from the LO generator network.

Those skilled in the art will recognize that a wide variety of modifications, alterations, and combinations can be made with respect to the above described embodiments without departing from the scope of the invention. Such modifications, alterations, and combinations are to be viewed as being within the ambient of the inventive concept.

What is claimed is:

1. An apparatus for converting a radio frequency (RF) signal with multiple local oscillator phases, the apparatus comprising:
   a receiver mixer comprising:
      an input configured to receive an RF signal,
      an output, and
      at least three sets of switches, wherein each set of switches is configured to be connected to the input to receive the RF signal and to selectively pass a portion of the RF signal to the output, wherein each set of switches is configured to be activated at a different phase of a local oscillator to effect passing of different phases of the RF signal to the output using a local oscillator frequency which is an integer submultiple of the frequency of the RF signal;
   wherein each set of switches comprises:
      a first pair of switches configured to receive a first phase of a local oscillator to thereby receive the RF signal with a first phase shift; and
      a second pair of switches configured to receive a second phase of the local oscillator to thereby receive the RF signal with a second phase shift;
   wherein the first and second phases are different among the respective sets of switches.

2. The apparatus of claim 1 further comprising a controller configured to receive an output from the receiver mixer and to wake up the apparatus from a low power mode in response to receiving a harmonic or subharmonic of a main receiver frequency for the apparatus.

3. The apparatus of claim 1 wherein the first pair of switches within each set are configured to receive the first phase of the local oscillator are connected to receive the first phase of the local oscillator at respective gates of the first pair of switches, and wherein the second pair of switches within each set are configured to receive the second phase of the local oscillator are connected to receive the second phase of the local oscillator at respective gates of the second pair of switches.

4. The apparatus of claim 3 wherein the first and second pairs of switches are connected to provide equal loading to a local oscillator network.

5. The apparatus of claim 1 wherein a drain/source from a first switch of the first pair of switches configured to receive the first phase is electrically connected to a first node of the output and to a drain/source from a first switch of the second pair of switches configured to receive the second phase, and
   wherein a second node of the output, different from the first node, is electrically connected to a drain/source from a second switch of the first pair of switches configured to receive the first phase and to a drain/source from a second switch of the second pair of switches configured to receive the second phase.

6. The apparatus of claim 1 wherein the receiver mixer is configured to receive multi-phase square waveforms from the local oscillator to receive a signal at a first RF frequency and to create a selective harmonic null at a second RF frequency.

7. The apparatus of claim 1 further comprising a phase controller operatively connected to a local oscillator network and configured to control opening and closing of individual switches of the at least three sets of switches to control phasors of the local oscillator received by the receiver mixer.

8. The apparatus of claim 1 further comprising:
   at least one antenna operatively connected to provide the RF signal to the input;
   a baseband processing unit connected to receive signals from the output, wherein a subset of the baseband processing unit is used for fast detection of a wake up signal.

9. The apparatus of claim 8 further comprising:
   a second receiver mixer comprising:
      a second mixer input configured to receive a second RF signal that is one of the RF signal from the antenna or a different RF signal from a second antenna,
      a second mixer output, and
      at least two sets of switches connected to selectively pass a portion of the second RF signal to the second mixer output, with individual ones of the sets of switches connected to be activated at different phases of the local oscillator to effect passing of different phases of the second RF signal to the second mixer output;

wherein individual ones of the at least two sets of switches comprise:

two switches configured to provide a first phase from the local oscillator network to the receiver mixer to receive the second RF signal with a first second-receiver phase shift;

another two switches configured to provide a second phase from the local oscillator network that is a harmonic of the first phase to the receiver mixer to receive the second RF signal with a second second-receiver phase shift;

wherein the baseband processing unit is configured to operate in a time multiplexed fashion between the receiver mixer and the second receiver mixer.

10. The apparatus of claim 9 wherein a same clock generator network is connected to provide phases from the local oscillator to both the receiver mixer and the second receiver mixer.

11. The apparatus of claim 9 further comprising a wake up radio receiver configured to operate at a first carrier frequency F1 and a main radio receiver configured to operate at a second carrier frequency F2 where F1=N*F2; wherein N is an integer and where the local oscillator's frequency is one or an integral submultiple of F1 or F2, whichever is lowest.

12. The apparatus of claim 1 further comprising a local oscillator network configured to provide the local oscillator, wherein the local oscillator network comprises a ring oscillator.

13. A method of converting among multiple phases in a radio frequency (RF) signal setting, the method comprising:

receiving first and second RF signals by first and second receiver mixers respectively, each receiver mixer having at least three sets of switches;

receiving different phases of a local oscillator at different gates of each set of switches to effect opening and closing of the switches;

in response to receiving the different phases, outputting, by the receiver mixer, a first output current proportional to the first RF signal and creating a selective harmonic null at a second RF frequency and outputting, by the second receiver mixer, a second output current proportional to the second RF signal and creating a selective harmonic at a second RF frequency.

14. The method of claim 13 further comprising:

receiving one or both of the first RF frequency and the second RF frequency at a baseband processing unit;

detecting at the baseband processing unit receipt of a wake up signal at one of the first frequency and the second frequency; and in response to detecting the wake up signal, waking up a radio receiver including the at first and second receiver mixers and configuring the radio receiver to receive a primary radio signal that uses one of the first RF frequency and the second RF frequency.

15. The method of claim 14 further comprising operating the baseband processing unit in a time multiplexed fashion between individual ones of the first and second receiver mixers.

16. The method of claim 14 further comprising creating a selective harmonic null by combining outputs of the first and second receiver mixers at an interface between the first and second receiver mixers and the baseband processing unit.

17. The method of claim 14 further comprising creating a selective harmonic null by combining outputs of the baseband processing unit and at least one other baseband processing unit either in an analog domain or a digital domain.

18. The method of claim 13 further comprising opening and closing individual switches of the at least three sets of switches to effect the output of the first frequency aspect and the second frequency aspect.

19. The method of claim 13 further comprising providing phases from the local oscillator from a same multi-phase clock generator to first and second receiver mixers.

20. An apparatus for receiving a radio frequency signal, the apparatus comprising:

a single multi-phase clock generator configured to provide multiple phases of a local oscillator;

first and second receiver mixers, individual ones of which comprising:

an input configured to receive an RF signal, an output, and at least three sets of switches connected to selectively pass a portion of the RF signal to the output, with individual ones of the sets of switches connected to be activated at different phases of a local oscillator comprising a ring oscillator to effect passing of different phases of the RF signal to the output, wherein individual ones of the at least two sets of switches comprise:

two switches configured to provide a first phase from the single multi-phase clock generator to the receiver mixer to receive the RF signal with a first phase shift, another two switches configured to provide a second phase from the single multi-phase clock generator that is a harmonic of the first phase to the receiver mixer to receive the RF signal with a second phase shift;

wherein the first receiver mixer has a different number of sets of switches than the second receiver mixer to provide different harmonic nulls, a baseband processing unit configured to receive outputs from the first and second receiver mixers and to wake up the apparatus from a low power mode in response to receiving a harmonic or subharmonic of a main receiver frequency for the apparatus;

a phase controller configured to provide select phases to the first and second receiver mixers from the single multi-phase clock generator.

* * * * *